Nov. 22, 1966    C. O. WEISENBACH    3,286,990
HYDRAULIC SYSTEM
Filed May 3, 1965
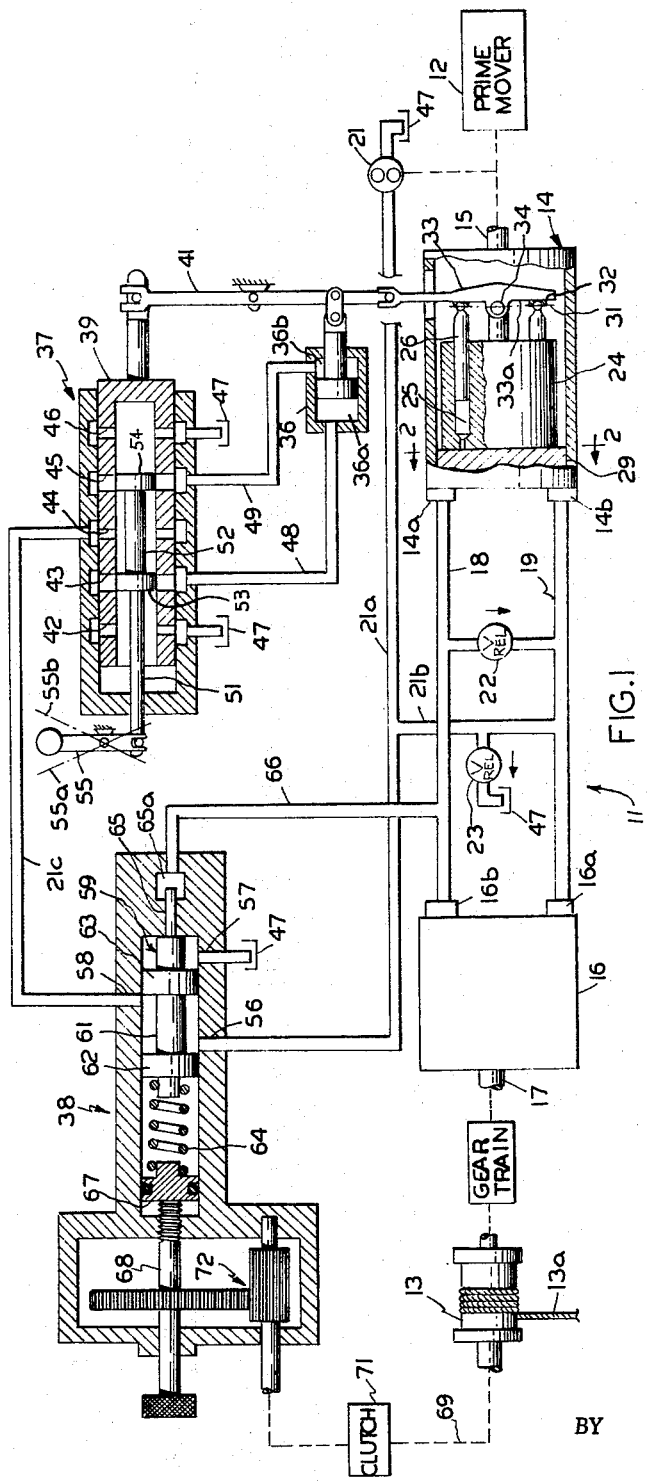
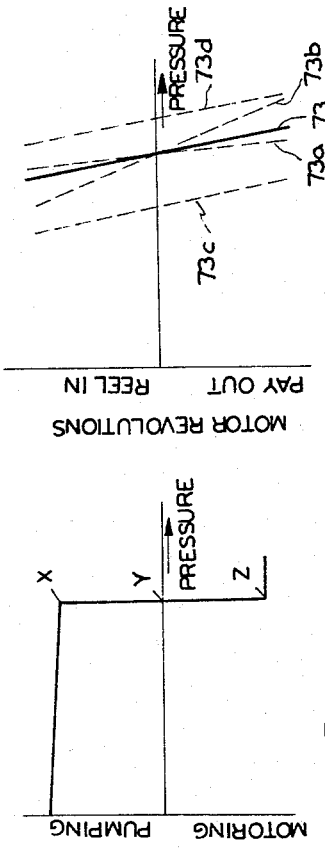
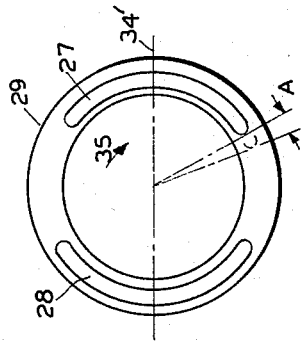
INVENTOR
CHARLES O. WEISENBACH
BY Dodge and Sons
ATTORNEYS United States Patent Office 3,286,990
Patented Nov. 22, 1966

3,286,990
HYDRAULIC SYSTEM
Charles O. Weisenbach, Watertown, N.Y., assignor to The New York Air Brake Company, a corporation of New Jersey
Filed May 3, 1965, Ser. No. 452,517
7 Claims. (Cl. 254—172)

This invention relates to towing systems employing power-operated winches.

The object of the invention is to provide an improved system of this type which maintains the towing cable under tension at all times, which allows the towing length of the cable to be varied at will, and which serves automatically to maintain the selected towing length substantially constant in spite of changes in the drag of the towed object. According to the invention, the towing winch is driven through a hydrostatic transmission that includes one motor-pump unit which is connected with the winch, and a second motor-pump unit of the overcenter type that is connected with the prime mover. The overcenter unit is equipped with a pressure compensator that serves to maintain the operating pressure in the high pressure side of the transmission circuit substantially constant at a predetermined value regardless of whether the overcenter unit is pumping or motoring. Because of this, the cable is always loaded in tension. The transmission also includes manually operable control means for varying the predetermined value so that the torque output of the winch-connected motor-pump unit can be changed as required to satisfy various loading conditions. Finally, the transmission incorporates control means for automatically raising and lowering the predetermined value of operating pressure as the winch pays out and reels in cable, respectively. This control tends to re-establish the selected towing length of the cable after that length is changed as a result of a transient increase or decrease in towing drag.

The preferred form of the invention is described herein with reference to the accompanying drawing in which:

FIG. 1 is a schematic diagram of the improved towing system.

FIG. 2 is a sectional view taken on line 2—2 of FIG. 1.

FIG. 3 is a graph showing the relationship between flow rate and pressure that characterizes the compensator.

FIG. 4 is a graph illustrating the manner in which operating pressure varies with winch movement.

As shown in FIG. 1, the towing system comprises a hydrostatic transmission 11 arranged to transfer power between a prime mover 12 and a cable winch 13. The transmission 11 includes a rotary overcenter motor-pump unit 14, whose drive shaft 15 is connected to drive and be driven by prime mover 12, a fixed displacement rotary hydraulic motor-pump unit 16, whose shaft 17 is connected with winch 13 through a speed-reducing gear train, and a pair of conduits 18 and 19 which connect the two units 14 and 16 in a closed hydraulic circuit. Since, as will be apparent from the following discussion, the direction of flow through the closed circuit reverses, the ports 14a and 14b of unit 14 and the ports 16a and 16b of unit 16 serve alternately as the inlet and discharge port for the associated unit. A charge pump 21, which is driven by prime mover 12, and which is connected with conduit 19 by conduits 21a and 21b, maintains the closed hydraulic circuit liquid-filled. High and low pressure relief valves 22 and 23, respectively, limit the pressures in the two sides of this circuit.

Both of the hydraulic units 14 and 16 are of the rotary cylinder barrel, longitudinally reciprocating piston type, such as those manufactured by my assignee under the trademark DYNAPOWER. Unit 14 includes a cylinder barrel 24 which is connected in driven relation with shaft 15 by splines (not shown) and which contains a circular series of cylinder bores 25 that receive the pistons 26. At its left end, each cylinder bore 25 terminates in a port which registers sequentially with the arcuate ports 27 and 28 (see FIG. 2) formed in a stationary valve member 29 and connected, respectively, with the main ports 14a and 14b. The projecting end of each piston 26 is formed with a spherical head whose center lies in the common plane 31 and which carries a shoe 32 that bears against the cam plate 33. The cam plate is supported by two trunnions 34 which are journaled in the housing of unit 14, and are positioned so that their axes are normal to the axis of rotation of cylinder barrel 24 and intersect the last mentioned axis in the plane 31 containing the centers of the spherical ends of the pistons. In the complete hydraulic unit, the shoes 32 are held against the cam plate by a return plate (which has been omitted for reasons of clarity) which is attached to the cam plate and serves to move the pistons on their intake strokes when the unit is pumping.

Since unit 14 is of the overcenter type, the cam plate 33 is capable of rotating in opposite directions from the illustrated neutral or zero displacement position, in which its face 33a lies in a plane that is normal to the axis of rotation of cylinder barrel 24, toward one or the other of two maximum displacement positions. In this description, I shall refer to the cam plate as being at the pumping side of neutral when its upper end is to the right of a plane which is normal to the axis of rotation of cylinder barrel 24 and which contains the axis of trunnions 34, and as being at the motoring side of neutral when the upper end is to the left of that plane. The cam plate 33 is continuously biased in the counterclockwise direction toward the maximum displacement position at the motoring side of neutral by a moment developed by the pistons 26. This moment comprises three components, the first of which is attributable to the inertia of the pistons themselves. When the unit 14 is pumping, cam plate 33 is at the pumping side of neutral, and consequently all of the pistons 26 located above the axis of rotation of cylinder barrel 24 are either moving to the left at the start of their discharge strokes and are accelerating, or are moving to the right at the end of their suction or inlet strokes and are decelerating. The cam plate 33 supplies the forces required to produce these changes in velocity, and since they act to the left, the cam plate 33 experiences an equal and opposite reaction which tends to tilt it in the clockwise direction about the axis of trunnions 34. Those pistons 26 located below the axis of rotation are either moving to the left at the end of their discharge strokes and are decelerating, or are moving to the right at the beginning of their inlet strokes and are accelerating. Therefore, these pistons are also subjected to accelerating forces, but in this case, the forces act to the right and are supplied by the return plate (not illustrated). However, since the reaction force for the return plate is supplied by the cam plate 33 through the shoes 32 of those pistons 26 located above the axis of rotation, the inertia forces of the pistons 26 located below that axis also urge the cam plate 33 in the clockwise direction. Any piston 26 lying in the horizontal plane containing the axis of rotation exerts no inertia force on the cam plate because it is in mid-stroke position where its velocity is a maximum and its acceleration is zero. When the unit 14 is motoring, cam plate 33 is automatically shifted to the motoring side of neutral. Therefore, in anlysis of the accelerating forces in this mode of operation will reveal that the inertia force component of the biasing moment urges the cam plate 33 in the counterclockwise direction.

The second component of the biasing moment results from the fact that unit 14 employs an odd number of pistons, usually nine, so that sometimes the number of pistons located above the axis of rotation which are subjected to high pressure exceeds the number located below the axis that are subjected to this pressure; and, at other times, the greater number of pistons subjected to high pressure lies below the axis of rotation. Therefore, the hydraulic forces exerted by the pistons 26 sometimes produce a moment that urges the cam plate in the clockwise direction, and at other times produce a moment that urges the cam plate in the opposite direction. This reversal in the direction of action of the biasing moment occurs each time a cylinder bore 25 moves out of registration with point 28 and into registration with part 27, and each time a cylinder bore 25 moves out of registration with port 27 and into registration with port 28. Because of this, the frequency with which this component of the biasing moment changes direction usually is so high that the component has no effect on the position of cam plate 33 during either the pumping or the motoring mode of operation.

The final component of the biasing moment is attributable to an apparent extension of high pressure port in the stationary valve 29. As can be seen in FIG. 2, each of the ports 27 and 28 is physically symmetrical about the cam plate trunnion axis 34', so it would seem that, except for the high frequency reversal in the hydraulic force moment mentioned above, the hydraulic forces exerted on cam plate 33 by those pistons whose cylinder bores are in communication with the high pressure port would produce equal and opposite moments. However, it has been found that rotation of the cylinder barrel causes the pressure distribution on the face of the stationary valve 29 to shift in the direction of rotation. In the illustrated embodiment, wherein prime mover 12 drives unit 14 in the direction of arrow 35 in FIG. 2, the effect of this shift is to extend the trailing end of the high pressure port 27 through an angle A and thus increase the angular extent of that portion of this port located below axis 34'. As a result, the number of pistons 26 located below axis 34' that are subjected to high pressure is increased, and the hydraulic force moment acting on cam plate 33 is unbalanced. This unbalanced moment acts in the counterclockwise direction, and, during pumping operation, it opposes the inertia force moment. The components of unit 14 are so designed that under the speed and pressure conditions that are to be encountered in operation, the hydraulic force moment predominates. Therefore, during pumping operation, cam plate 33 is continuously biased toward the zero displacement position.

During motoring operation, cam plate 33 moves over center to the motoring side of neutral, and consequently port 27 continues to be the high pressure port and the direction of rotation remains unchanged. Therefore, the unbalanced hydraulic force moment continues to act in the counterclockwise direction. However, now this moment supplements the inertia force moment, and the cam plate 33 is urged away from rather than toward the zero displacement position.

This type of biasing moment can also be developed by actually rotating the valve member 29, or the ports 27 and 28 therein, in the clockwise direction so that high pressure port 27 is no longer symmetrical about the trunnion axis 34'. However, in all of these cases it is possible, particularly under high speed and low pressure operating conditions, that the hydraulic force moment developed during pumping operation cannot be made larger than the inertia force moment. If this situation should arise, some auxiliary biasing means, such as a spring, can be used to develop the continuous counterclockwise biasing moment on cam plate 33.

The cam plate 33 of unit 14 is positioned by a double-acting motor 36 which is under the control of a follow-up valve 37 and a pressure responsive pilot valve 38. The follow-up valve comprises a housing containing a reciprocable valve sleeve 39 which is connected with cam plate 33 through a follow-up link 41, and which contains five sets of longitudinally spaced radial passages 42–46. Exhaust passages 42 and 46 are connected with reservoir 47, motor passages 43 and 45 are connected with the working chambers 36a and 36b, respectively, of motor 36 through conduits 48 and 49, and supply passage 44 is connected with the conduit 21c leading to pilot valve 38. Communication between the motor passages and the supply and exhaust passages is controlled by a valve plunger 51 formed with an annular groove 52 that defines two valve lands 53 and 54. An actuator 55 is provided for shifting plunger 51 within sleeve 39. Lands 53 and 54 are slightly narrower than passages 43 and 45, respectively, so that when the plunger 51 is in a null position with respect to sleeve 39, as illustrated, motor passages 43 communicate with supply passages 44 and exhaust passages 42, and motor passages 45 communicate with supply passages 44 and exhaust passages 46.

Pilot valve 38 includes an inlet passage 56 which is connected with charge pump conduit 21a, an exhaust passage 57 which communicates with the hydraulic reservoir or tank 47, and an outlet passage 58 which is connected with conduit 21c. The outlet passage 58 of valve 38 is selectively connected with the passages 56 and 57 by a valve spool 59 formed with an annular peripheral groove 61 and a pair of lands 62 and 63. The spool 59 is biased to the illustrated supply position, in which groove 61 interconnects passages 56 and 58, by a coil compression spring 64, and is shifted to the left to a vent position, in which passage 58 is connected with exhaust passage 57, by piston motor 65. In addition to these positions, valve spool 59 has an intermediate lap position in which land 63 isolates outlet passage 58 from both the inlet passage 56 and the exhaust passage 57. The working chamber 65a of motor 65 is in continuous communication with conduit 18 via conduit 66, and, therefore, motor 65 positions valve spool 59 in accordance with the pressure in the high pressure side of the closed transmission circuit.

The pressure at which valve 38 shifts from its supply position to its vent position depends upon the load in spring 64, and this load, in turn, depends upon the position of the movable spring seat 67. The towing system includes two devices for changing the position of this seat; one being manually operable and comprising the adjusting screw 68, and the other operating automatically in response to rotation of the output shaft 17 of motor-pump unit 16. This second device comprises a drive connection 69, including a manually operable clutch 71, and a speed reducing gear train 72 which connects the driving connection 69 with the adjusting screw 68. The parts of this automatic control are so arranged that it retracts screw 68, and allows seat 67 to move to the left, when unit 16 is driving winch 13 in the reel in direction, and advances screw 68, and shifts seat 67 to the right, when the winch 13 is paying out cable and is driving unit 16 as a pump.

Structurally, unit 16 is the same as unit 14, except that it has a stationary cam plate, i.e., one whose angle of inclination with respect to the axis of rotation of the cylinder barrel is fixed.

*Operation*

It is assumed that when the towing system is first put in operation, clutch 71 is disengaged and that valve 38 is set for a safe limiting pressure which is higher than that required by unit 16 in order to balance the towing drag on cable 13a. Under these conditions, spring 64 holds valve spool 59 in the illustrated supply position so that a portion of the output of charge pump 21 is delivered to follow-up valve 37 through conduit 21a, inlet passage 56, peripheral groove 61, outlet passage 58 and conduit 21c. If the plunger 51 of follow-up valve 37 is in the illustrated neutral position, this fluid is returned to tank 47 along two parallel paths; one path including radial passages 44, groove 52 and radial passages 43 and 42, and the other path including radial passags 44, groove 52 and radial passages 45 and 46. Valve lands 53 and 54 restrict these paths, and create backpressures which are transmitted to the working chambers 36a and 36b of motor 36 through conduits 48 and 49, respectively. Since motor 36 employs a differential area piston, these pressures develop a shifting force which tends to move cam plate 33 to the pumping side of neutral. However, inasmuch as any movement in this direction immediately causes follow-up connection 41 to move valve sleeve 39 to the left and disconnect working chambers 36a and 36b from supply passages 44 and exhaust passages 46, respectively, the shifting force is eliminated as soon as the cam plate starts to move. Therefore, as long as pilot valve 38 and valve plunger 51 of valve 37 remain in their illustrated positions, cam plate 33 will be maintained in its zero displacement position and the hydrostatic transmission will be locked.

Although the towing system is inactive for most purposes when follow-up valve 37 is in the neutral position, it is effective to prevent overloading of cable 13a. If an overload develops, and the pressure in conduit 18 rises above the setting of valve 38, motor 65 will shift valve spool 59 to its vent position and thereby cause it to dissipate the pressures in working chambers 36a and 36b. This enables the biasing moment developed by pistons 26 to move cam plate 33 to the motoring side of neutral and unlock the hydrostatic transmission. Since this movement of cam plate 33 away from the zero displacement position reduces the pressure in conduit 18, spring 64 will shift valve spool 59 to its lap position when the displacement of unit 14 has increased sufficiently to restore operating pressure to the desired maximum. Since follow-up link 41 moves valve sleeve 39 to the right from the null position relative to plunger 51 as the cam plate 33 moves away from the neutral position, working chamber 36a is now isolated from tank 47. Therefore, when valve spool 59 is shifted to its lap position, motor 36 becomes hydraulically locked against further movement in the displacement-increasing direction. The system will now pay out cable at a rate determined by the displacement of unit 14 as long as the overload condition persists. However, the tension in the cable will not exceed the permissible limit determined by the setting of valve 38.

When the overload on cable 13a abates, the pressure in conduit 18 will decrease below the setting of valve 38 and spring 64 will shift valve spool 59 to its supply position. Now motor 36 will return cam plate 33 to its neutral position.

The towing length of cable 13a can be increased manually by shifting actuator 55 in the counterclockwise direction toward the limiting position indicated by numeral 55a. This actuator movement produces rightward movement of valve plunger 51, thereby causing land 53 to block communication between radial passages 43 and 44, and causing land 54 to block communication between radial passages 45 and 46. Inasmuch as working chambers 36a and 36b are now vented and pressurized, respectively, motor 36 moves cam plate 33 to the motoring side of neutral. As the cam plate moves in this direction, follow-up connection 41 shifts valve sleeve 39 to the right. Therefore, when the cam plate 33 reaches a position corresponding to the new position of actuator 55, valve sleeve 39 will be in a null position relative to plunger 51 and motor 36 will come to rest. Since the hydrostatic transmission is no longer locked, the load acting on cable 13a will cause winch 13 to move in the pay out direction and drive unit 16 as a pump. Therefore, unit 16 will, in turn, drive unit 14 as a motor. The speed at which cable is paid out depends directly upon the displacement of unit 14, and this is controlled by actuator 55. During this manually controlled pay out operation, pilot valve 38 acts in the manner previously described to limit system pressure, and consequently the tension in cable 13a.

When the required amount of cable has been paid out, the operator returns valve plunger 51 to its illustrated position. Now land 53 isolates working chamber 36a from tank 47, and land 54 isolates working chamber 36b from charge pump 21. Therefore, motor 36 develops a force that moves cam plate 33 in the clockwise direction back toward its zero displacement position. This movement of the cam plate is accompanied by leftward movement of valve sleeve 39, so when cam plate 33 reaches the zero displacement position, the valve sleeve will again be in a null position with respect to valve plunger 51.

Shortening of the towing length of cable 13a is effected by shifting actuator 55 in the clockwise direction toward limiting position 55b. In this case, motor 36 moves cam plate 33 to a displacement position at the pumping side of neutral, and unit 14 is caused to operate as a pump and discharge fluid to conduit 18. Therefore, unit 16 acts as a motor and drives winch 13 in the reel in direction. As in the previous case, the rate at which the cable moves depends upon the distance actuator 55 has been shifted from its illustrated neutral position, and system pressure is limited to a safe value by pilot valve 38. However, it should be noted that since unit 14 is now serving as a pump, and the cam plate 33 is at the pumping side of neutral, the biasing moment developed by pistons 26 urges the cam plate toward, rather than away from, the zero displacement position. Because of this, valve 38 limits pressure by reducing, rather than increasing, the displacement of unit 14. When the selected cable length has been established, valve plunger 51 is returned to its neutral position to thereby again render the hydrostatic transmission inactive.

During a towing operation, pilot valve 38 is rendered effective to control cable tension by shifting actuator 55 to, and leaving it in, the reel in position 55b, and by manually retracting screw 68 until the pressure setting of valve 38 is reduced to a value that enables hydraulic unit 16 to just balance the load on winch 13. Under these conditions, the pressure in conduit 18 will increase to the setting of valve 38 as soon as the cam plate reaches a position in which the delivery rate of unit 14 equals the rate of leakage from the closed circuit. Therefore, at that time, motor 65 will shift valve spool 59 to its lap position and prevent cam plate 33 from following further the movement of actuator 55. Since valve sleeve 39 will be positioned to the right of the null position relative to plunger 51, working chamber 36a now will be isolated from tank 47 and motor 36 will be hydraulically locked against movement under the action of the biasing moment of pistons 26.

If the operating pressure in conduit 18 should now increase, for example, as a result of an increase in either the speed of prime mover 12 or the load on cable 13a, motor 65 will shift valve spool 59 to its vent position and release the hydraulic lock at working chamber 36a. This enables the biasing moment developed by pistons 26 to move cam plate 33 in the counterclockwise direction and reduce the displacement of unit 14. If the change in pressure was caused by a change in driving speed, normal operating pressure will be restored when the cam plate 33 reaches a smaller displacement position at the pumping side of neutral in which the output of unit 14 again matches the leakage rate. On the other hand, if the change in pressure resulted from a change in towing drag, i.e., load, cam plate 33 must move through the zero displacement position to a position at the motoring side of neutral in order to restore the pressure in conduit 18 to the selected value. In either case, spring 64 will shift valve spool 59 back to its lap position, and cause land 63 to again hydraulically lock working chamber 36a, as soon as the operating pressure has decreased to the set value.

If the operating pressure in conduit 18 should decrease below the setting of valve 38, spring 64 will shift valve spool 59 to its supply position and open the supply path from charge pump 21 to follow-up valve 37. In this case, motor 36 moves cam plate 33 in the clockwise direction toward the maximum displacement position corresponding to the position 55b of actuator 55. When the change in the displacement of unit 14 which results from this movement of the cam plate restores the operating pressure to the selected value, valve spool 59 will move back to its lap position and again hydraulically lock working chamber 36a. FIG. 3 shows the characteristic flow versus pressure relationship established by valve 38; the curve portion XY representing the controlling range for pumping operation, and the curve portion YZ representing the controlling range for motoring operation.

From the preceding discussion it should be evident that whenever clutch 71 is disengaged and actuator 55 is in position 55b, the controls for unit 14 will automatically vary the position of cam plate 33 as needed to maintain the pressure in conduit 18 substantially constant. Therefore, the tension in cable 13a will also be substantially constant. However, since changes in towing drag will cause the system to reel in or pay out cable, the towing length of the cable will not be constant. In marine installations, where the system is used to tow a barge, the changes in towing distance can be substantial if the sea is rough. In the illustrated embodiment, this condition is eliminated by engaging clutch 71 and thereby completing the driving connection between unit 16 and screw 68. Now, as shown by the solid curve 73 of FIG. 4, the pressure setting of valve 38 is automatically increased and decreased, respectively, as cable is paid out and reeled in. If the towing drag should now increase momentarily above the normal value, as a result, for example, of the towed barge encountering a wave, winch 13 will drive unit 16 as a pump and cause it, in turn, to drive unit 14 as a motor. As explained above, valve 38 will shift to its vent position and allow the biasing moment to move cam plate 33 to the motoring side of neutral. However, since driving connection 69, acting through gear train 72 and screw 68, simultaneously shifts seat 67 to the right, and thus raises the pressure setting of valve 38, cam plate 33 will not move to a position that restores the normal operating pressure, but will come to rest in a smaller displacement position which produces a higher operating pressure that enables unit 16 to balance the increased load. As the wave passes the barge, the towing drag and the pressure in conduit 18 decrease to their normal values. Since valve 38 is, at this time, set to establish an operating pressure higher than the normal value, spring 64 immediately shifts valve spool 59 to its supply position, and motor 36 moves cam plate 33 back to the pumping side of neutral. Now unit 14 drives unit 16 as a motor and causes winch 13 to reel in cable. As unit 16 moves in the reel in direction, driving connect 69 retracts screw 68 and reduces the setting of valve 38. Therefore, this valve vents working chamber 36a and allows cam plate 33 to move toward the zero displacement position. When the winch 13 has been moved back to its initial position, cam plate 33 will be in a small displacement position, in which the output of unit 14 equals the rate of leakage, and valve spool 59 will be in its lap position.

If, when clutch 71 is engaged, the towing drag momentarily decreases, as a result, for example, of the towing tug encountering a wave, the controls for unit 14 will move cam plate 33 to an increased displacement position at the pumping side of neutral, and unit 16 will commence to drive winch 13 in the reel in direction. Since driving connection 69 retracts screw 68 and lowers the pressure setting of valve 38 as winch 13 rotates in this direction, cam plate 33 will come to rest when the operating pressure in conduit 18 corresponds to the new, lower setting of valve 38. Since this pressure is less than that required to balance the load under normal towing conditions, it will be evident that the cable 13a will drive winch 13 and unit 16 in the pay out direction as soon as the wave passes the tug and the towing drag increases to the normal value. As the winch 13 returns to its original position, the setting of valve 38 increases, and, when the winch reaches that position, valve spool 59 will again be in its lap position and cam plate 33 will be in its leakage-compensating position at the pumping side of neutral.

The solid curve 73 of FIG. 4 shows the relationship between the pressure setting of valve 38 and the rotary position of the shaft 17 of unit 16. The slope of this curve, i.e., the rate of change of pressure with respect to shaft movement, can be varied, as indicated by dashed curves 73a and 73b, by changing the ratio of the gear train 72 or by changing the spring rate of biasing spring 64. On the other hand, the curve 73 is displaced along the pressure axis (see dashed curves 73c and 73d) whenever screw 68 is repositioned manually while clutch 71 is disengaged.

It should be noted that when the plunger 51 of follow-up valve 37 is in position 55b and clutch 71 is disengaged, the towing length of cable 13a can be changed by manipulating screw 68 and either raising or lowering the setting of valve 38 relative to the pressure required to balance the load on winch 13. While this capability makes the illustrated system somewhat redundant, it nevertheless is desirable to include the follow-up valve 37 because it is a more convenient control to use, and also because it allows the operator to render the hydrostatic transmission inactive.

As stated previously, the drawing and description relate only to the preferred embodiment of the invention. Since the structural form of the components used in this embodiment can be changed without departing from the inventive concept, the following claims should provide the sole measure of the scope of the invention.

What is claimed is:

1. A towing system comprising
  (a) a winch adapted to reel in and pay out cable;
  (b) a reversible rotary hydraulic motor-pump unit connected to drive and be driven by the winch and having a pair of ports, the unit serving as a motor for driving the winch in the reel in direction when the direction of flow through it is from the first port to the second port, and serving as a pump that discharges fluid from the first port when it is driven by the winch and the latter is moving in the pay out direction;
  (c) a prime mover;
  (d) an overcenter rotary hydraulic motor-pump unit connected to be driven by and to drive the prime mover and having first and second ports and a displacement control element movable between maximum displacement positions located at opposite sides of a zero displacement position, the displacement control element causing the unit to discharge fluid through the first and second ports, respectively, when in its first and second maximum displacement positions, and being biased toward the second maximum displacement position;
  (e) conduit means connecting the two hydraulic units in a closed hydrostatic transmission circuit, the first and second ports of one unit being connected with the first and second ports, respectively, of the other unit;
  (f) regulating means responsive to the pressure at the first port of the overcenter unit for positioning the displacement control element so as to maintain said pressure constant at a predetermined value; and
  (g) first and second control means connected with the regulating means and alternately effective to vary said predetermined value, the first control means being responsive to operation of the winch and serving to increase and decrease said predetermined value as the winch moves in the pay out and reel in directions, respectively.

2. A towing system as defined in claim 1 in which the second control means is manually operable.

3. A towing system comprising
   (a) a winch adapted to reel in and pay out cable;
   (b) a first rotary hydraulic motor-pump unit connected to drive and be driven by the winch and having a pair of ports, the unit driving the winch in the reel in direction when it is supplied with motive fluid through the first port, and discharging fluid through the first port when the winch moves in the pay out direction and drives it as a pump;
   (c) a prime mover;
   (d) a second rotary hydraulic motor-pump unit connected to be driven by and to drive the prime mover and having a pair of ports, this unit being of the overcenter type and including a displacement control element which is movable between maximum displacement positions at opposite sides of a zero displacement position, the displacement control element causing the unit to discharge fluid through the first and second ports, respectively, when in its first and second maximum displacement positions, and being biased toward the second maximum displacement position;
   (e) conduit means connecting the two units in a closed hydrostatic transmission circuit, the first and second ports of one unit being connected with the first and second ports, respectively, of the other unit;
   (f) a source of fluid under pressure and a reservoir;
   (g) a fluid pressure control motor connected with the displacement control element and arranged to move that element toward the first maximum displacement position;
   (h) a pilot valve connected with the source, the reservoir and the control motor and including a movable member shiftable between first and second positions in which, respectively, it connects the control motor with the source and the reservoir;
   (i) a spring biasing the movable member of the pilot valve toward the first position;
   (j) means responsive to the pressure at the first port of the overcenter unit for shifting the movable member of the pilot valve toward the second position;
   (k) a seat for the biasing spring movable in spring load-increasing and spring load-decreasing directions;
   (l) manually operable means for positioning the spring seat;
   (m) control means responsive to operation of the winch for positioning the spring seat, said means moving the seat in the load-increasing and load-decreasing directions, respectively, as the winch moves in the pay out and the reel in directions; and
   (n) means for selectively rendering the control means effective and ineffective to position the spring seat.

4. A towing system as defined in claim 3 in which the overcenter unit is a rotary cylinder barrel, longitudinally reciprocating piston unit whose displacement control element is an angularly adjustable cam plate, the unit being so designed that when it is rotated in a fixed direction the forces transmitted between the pistons and the cam plate urge the cam plate toward the zero displacement position when the unit is pumping and the cam plate is at one side of the zero displacement position, and urge the cam plate away from the zero displacement position when the cam plate is at the opposite side of the zero displacement position and the unit is motoring.

5. A towing system comprising
   (a) a winch adapted to reel in and pay out cable;
   (b) a first rotary hydraulic motor-pump unit connected to drive and be driven by the winch and having a pair of ports, the unit driving the winch in the reel in direction when it is supplied with motive fluid through the first port, and discharging fluid through the first port when the winch moves in the pay out direction and drives it as a pump;
   (c) a prime mover;
   (d) a second rotary hydraulic motor-pump unit connected to be driven by and to drive the prime mover and having a pair of ports, this unit being of the overcenter type and including a displacement control element which is movable between maximum displacement positions at opposite sides of a zero displacement position, the displacement control element causing the unit to discharge fluid through the first and second ports, respectively, when in its first and second maximum displacement positions, and being biased toward the second maximum displacement position;
   (e) conduit means connecting the two units in a closed hydrostatic transmission circuit, the first and second ports of one unit being connected with the first and second ports, rsepectively, of the other unit;
   (f) a source of fluid under pressure and a reservoir;
   (g) double-acting control motor means connected with the displacement control element for moving that element between said maximum displacement positions, said motor means including a pair of opposed working chambers;
   (h) a double-acting servo valve connected with the reservoir and the opposed working chambers and having a supply passage, the servo valve including an input member and a follow-up member which is connected to move with the displacement control element, the two members having a null position in which they connect each working chamber with both the reservoir and the supply passage and being movable in opposite directions from that position to isolate a selected one of the working chambers from the supply passage and to isolate the remaining working chamber from the reservoir;
   (i) a pilot valve connected with the source, the reservoir and the supply passage of the servo valve and including a movable member shiftable between first and second positions in which, respectively, it connects the supply passage with the source and the reservoir;
   (j) a spring biasing the movable member of the pilot valve toward the first position;
   (k) means responsive to the pressure at the first port of the overcenter unit for shifting the movable member of the pilot valve toward the second position;
   (l) a seat for the biasing spring movable in spring load-increasing and spring load-decreasing directions;
   (m) manually operable means for positioning the spring seat;
   (n) control means responsive to operation of the winch for positioning the spring seat, said means moving the seat in the load-increasing and load-decreasing directions, respectively, as the winch moves in the pay out and the reel in directions; and
   (o) means for selectively rendering the control means effective and ineffective to position the spring seat.

6. A hydrostatic transmission comprising
   (a) first and second rotary hydraulic motor-pump units, the first unit being of the overcenter type and having a displacement control element movable between maximum displacement positions at opposite sides of a zero displacement position;
   (b) conduit means connecting the two units in a closed transmission circuit having a high pressure side and a low pressure side;
   (c) regulating means responsive to the pressure in the high pressure side of the circuit and arranged to position the displacement control element so as to maintain said pressure constant at a predetermined value when the first unit is either driving or being driven by the second unit; and (d) first and second control means connected with the regulating means and alternately effective to vary said predetermined value, the first control means being responsive to operation of the second unit and serving to raise and lower said predetermined value as the second unit moves in opposite directions.

7. A hydrostatic transmission as defined in claim 5 in which (a) the first hydraulic motor pump unit is of the rotary cylinder barrel, longitudinally reciprocating piston type and its displacement control element is an angularly adjustable cam plate, the unit being so designed that as it rotates in a fixed direction the forces transmitted between the pistons and the cam plate urge the cam plate toward the zero displacement position when the unit is pumping and the cam plate is at the same side of the zero displacement position as the first maximum displacement position, and urge the cam plate away from the zero displacement position when the cam plate is at the opposite side of the zero displacement position and the unit is motoring; and (b) the regulating means includes a fluid pressure control motor arranged to move the cam plate toward the first maximum displacement position, and means for venting and pressurizing the control motor as the pressure in the high pressure side of the circuit tends to rise above and fall below, respectively, said predetermined value.

References Cited by the Examiner

UNITED STATES PATENTS 2,763,467 9/1956 Doolittle _____ 254—172
3,180,090 4/1965 Hawley _____ 60—52

EVON C. BLUNK, *Primary Examiner.*

H. C. HORNSBY, *Assistant Examiner.*